United States Patent [19]

Schuurman

[11] Patent Number: 4,951,741

[45] Date of Patent: Aug. 28, 1990

[54] CHEMICAL HEAT PUMP SYSTEM FOR PRODUCING HEAT AND COLD

[76] Inventor: Eiko A. Schuurman, Post Office Box 645, 3436 CZ Nieuwegein, Netherlands

[21] Appl. No.: 436,913

[22] Filed: Nov. 15, 1989

[51] Int. Cl.$^5$ .............................................. F28D 21/00
[52] U.S. Cl. ................................. 165/104.12; 62/114; 62/210; 237/2 B
[58] Field of Search ..................... 165/104.12; 62/114, 62/210; 237/2 B

[56] References Cited

U.S. PATENT DOCUMENTS

| | | | |
|---|---|---|---|
| 3,370,420 | 2/1968 | Johnson | 165/104.12 |
| 3,967,676 | 7/1976 | Spacil | 165/104.12 |
| 4,044,821 | 8/1977 | Fletcher | 165/104.12 |
| 4,347,891 | 9/1982 | Chubb | 165/104.12 |
| 4,712,610 | 12/1987 | Viesten et al. | 165/104.12 |

OTHER PUBLICATIONS

McKisson, R. L., *Dissociation-Cooling*, Livermore Research Laboratory, Livermore, CA, Contract No. AT(-11-1)-74, 3/1954.

Primary Examiner—Albert W. Davis, Jr.

[57] ABSTRACT

This invention discloses an extremely simple chemical heat pump system, utilizing the chemical reaction heat of a perfectly reversible chemical disassociation reaction system, wherein one gaseous compound is involved in said reversible reaction. The present system can realize a large coefficient of performance over a very attractive temperature range and level for general use, by absence of any phase transition. Reaction kinetics of said system is excellent since only one reversible non-flammable gaseous compound is involved in said chemical heat pump system. Said system can be provided with a computer controlled system for changing the restriction value of the expansion valve. The said system is superior to most conventional compression system by replacing the use of ozone (layer) attacking C.F.C's (chlorofluorocarbons) over the entire temperature range.

15 Claims, 8 Drawing Sheets

CHEMICAL HEAT PUMP SYSTEM FOR PRODUCING HEAT AND COLD

BACKGROUND OF THE INVENTION

This invention relates to a chemical heat pump system utilizing the chemical reaction heat of a reversible chemical dimerization reaction. By dimerization herein is meant the association of two molecules of the same chemical compound. More particularly this invention relates to a chemical heat pump system having only one reactant, of improved efficiency and simplicity, at a very useful temperature range and temperature level.

PRIOR ART OF THE INVENTION

During the past years heat pumps have attracted renewed attention since they are able to save energy, because they can recover much energy from lower grade heat sources, using small amounts of primary energy, while decreasing environmental (air) pollution by decreasing the amount of fossil fuels and nuclear power and their wastes. Generally both electrical/mechanical energy and chemical/thermal energy can be used as said small amount of energy.

In the case of a so called compression-type heat pump system, using mechanical energy, the so called coefficient of performance (C.O.P.) is limited generally by internal and external irreversibilities and the temperatures of the higher grade heat sources in respect to safety, heat stability and mechanical strength of the system. On the other hand, in a chemical heat pump system, utilizing perfectly reversible endothermic and exothermic reactions, the internal irreversibilities can be completely eliminated and the temperature range of the lower grade heat source and the higher grade heat source can be broadened by selecting the reactive fluid (—compositon). For example, when a completely reversible reaction, (e.g., nitrogen dioxide, dimerizing reversibly to dinitrogen tetroxide) is utilized, the temperature of the lower grade heat source is about $-25$ degrees C. to $+50$ degrees C. and that of the higher grade heat source is about 50 degrees C. to 150 degrees C. On the other hand, when the completely reversible reaction of the dissociation of the same compound nitrogen dioxide, into nitrogen monoxide and oxygen is utilized, the temperature of the lower grade heat source can be about 150 degrees C. and the temperature of the higher grade heat source can be up to 600 degrees C.

Generally a dissociation reaction is an endothermic reaction and an association reaction is an exothermic reaction. Therefore, by carrying out these reactions in separate reactor tanks, each tank becomes an exothermic reactor tank or an endothermic reactor tank. By circulating a reactant between the exothermic reactor tank and the endothermic reactor tank, heat energy can be transported. Using this principle alone, however, the efficiency as a heat pump system is insufficient. This is because the dimerization reaction is neglible when the temperature of the reactor tank is too high. This fact is consistent with the principles of Van't Hoff and Le Châtelier. Therefore, it is necessary to shift the equilibrium by carrying out the dimerization reaction under compression. On the other hand, the dissociation reaction wil not proceed when the temperature of the reactor tank is too low—again in accordance with above mentioned principles. Therefore it is necessary to shift the equilibrium compositon by carrying out the dissociation reaction at reduced pressure. Though the normal boiling point and the melting point of the dimerization product are 21.2 degrees C. and $-11.2$ degrees C. respectively, there will be no phase transitions at all at temperatures down to $-60$ degrees C. under reduced pressure of 0.01 Bar. This fact greatly enhances the applicability of the chemical heat pump system for refrigerating and heating purposes in domestic use, as well as for industry, air conditioning units in buildings and vehicles etc.

As a new method, there has already been disclosed a chemical heat pump system utilizing a single reactant ($NO_2$) for the completely reversible chemical reaction, controlling the heating or cooling capacity and/or the heating or cooling temperature by means of an adjustable expansion valve (possibly computer) controlled, by means of a few cheap and simple temperature pick-ups; using the value of the electrical current to the compressor as a parameter to regulate the desired temperature or heat capacity, by adjusting the expansion valve, thereby changing the outlet pressure of the compressor thus changing electrical power consumption. Since the electrical current to the compressor is related to the outlet pressure of the compressor, this current is proportional to the amount of electrical power needed to reach a certain superheating through an electrical heater controlling a small overtemperature to avoid liquifying of the compressed gaseous reactant.

SUMMARY OF THE INVENTION

Therefore, a first object of the present invention is to provide a simple chemical heat pump system having a large coefficient of performance (C.O.P.) at a very attractive temperature range and temperature level.

The second object of the present invention is to provide a chemical heat pump system which not only realizes the large coefficient of performance, but also realizes excellent durability. The third object of the present invention is to provide a chemical heat pump system without ozone (layer) attacking chlorofluorocarbons as working fluids. The fourth object of the present invention is to provide a method to form a chemical heat pump system having a large coefficient of performance and an excellent durability without using chlorofluorcarbons (C.F.C.) by combining those arts. The above mentioned objects are accomplished by the chemical heat pump system characterized by utilizing an essentially reversible chemical reaction system, consisting of an association reaction and a dissociation reaction in the gaseous state.

According to the present invention, by utilizing gaseous equilibrium reactions of single compounds with fast reaction kinetics and large amounts of chemical reaction heat, the C.O.P. of the whole chemical heat pump system is remarkably improved.

The chemical heat pump system thus provided by this invention not only shows excellent thermal efficiency but also meets various requirements concerning temperatures of the lower grade heat source and the higher grade heat source by choice of the specific chemical reaction system utilized in the chemical heat pump system. Moreover, in the system provided by the present invention no solid state material circulates, therefore, the abrasion resistance of the system is excellent. The fifth object of the present invention is the fact that the used chemical reactant is allowing the use of current, well known construction material, (stainless steel) so the durability of the chemical heat pump system is excellent. The sixth object of the present invention is to provide a chemical heat pump system having a small electrical heater with preheating coil upstream and a submersed (immersed) compressor avoiding the gaseous reactant to change into a liquid phase during compression stroke and regaining as much as possible heat coming from the compressor.

Finally the chemical reactant used in said chemical heat pump system is a simple and cheap bulk chemical, easy to be manufactured. It can be safely neutralized without environmental harm (during dismantling of scrap recycling process).

DESCRIPTION OF THE PREFERRED EMBODIMENTS

The reversible dissociation reaction utilized in the present invention involves a monomolecular dissociation reaction which produces a gaseous product. Such a dissociation reaction is an endothermic reaction. In the present invention the endothermic reaction is carried out in the endothermic reactor tank and it is essential to use this reaction to move the heat energy from the lower grade heat source. Namely the product of the dissociation reaction then should be regenerated to the initial reactant under certain reaction conditions. This regenerating reaction in the present invention is preferably an association reaction in the gaseous phase. This association reaction is generally the exothermic reaction. In the present invention, it is preferable that said association reaction and the before mentioned dissociation reaction are completely reversible, so that no side reactions are taking place, withdrawing reactants from the reversible reaction system. Therefore, although there are many reaction systems in which a dissociation reaction and an association reaction are involved, however the preferable reaction systems in the present invention are perfectly reversible dissociation—association reactions (reacting almost instantaneously) Some of these reaction systems are reactions utilizing nitrogen compounds and sulfur compounds or iodo compounds.

Concrete examples of the reaction systems are as follows:

$$N_2O_4(g) \rightleftharpoons 2NO_2(g)$$

$$2NO_2(g) \rightleftharpoons 2NO(g) + O_2(g)$$

$$H_2S(g) \rightleftharpoons H_2(g) + S(g)$$

$$2HI(g) \rightleftharpoons H_2(g) + I_2(g)$$

Temperatures of the lower grade heat source and the higher grade heat source of the chemical heat pump system are determined by the absorbed heat quantity and the temperature of the exothermic reaction. Therefore, in the present invention it is possible to select the reaction and catalyst, if necessary, corresponding to the temperature of the lower grade heat source and the desired temperature of the higher grade heat source. In the above shown reactions all coumpounds exist in the gaseous state. An outline of the principle of the chemical heat pump system used in the present invention has been described herewith. The example being the case, where the dinitrogen tetroxide-nitrogen dioxide system is utilized.

Figure 1:
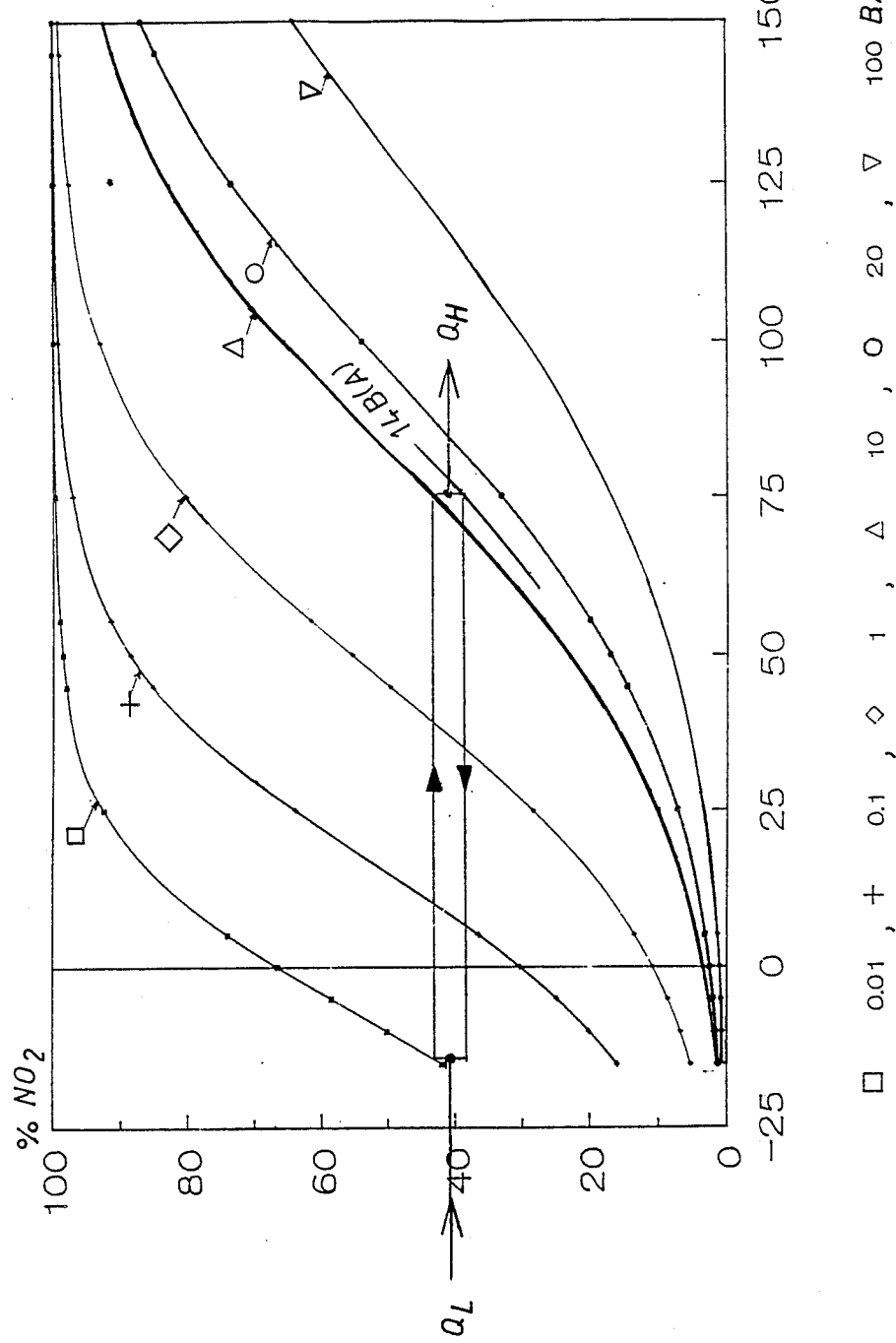
FIG. 1 is the fundamental diagram, explaining the working principles of the chemical heat pump system, showing the maxium attainable temperature difference in one step (90 degrees C.), at a 5% small chemical reaction band.
Figure 1A:
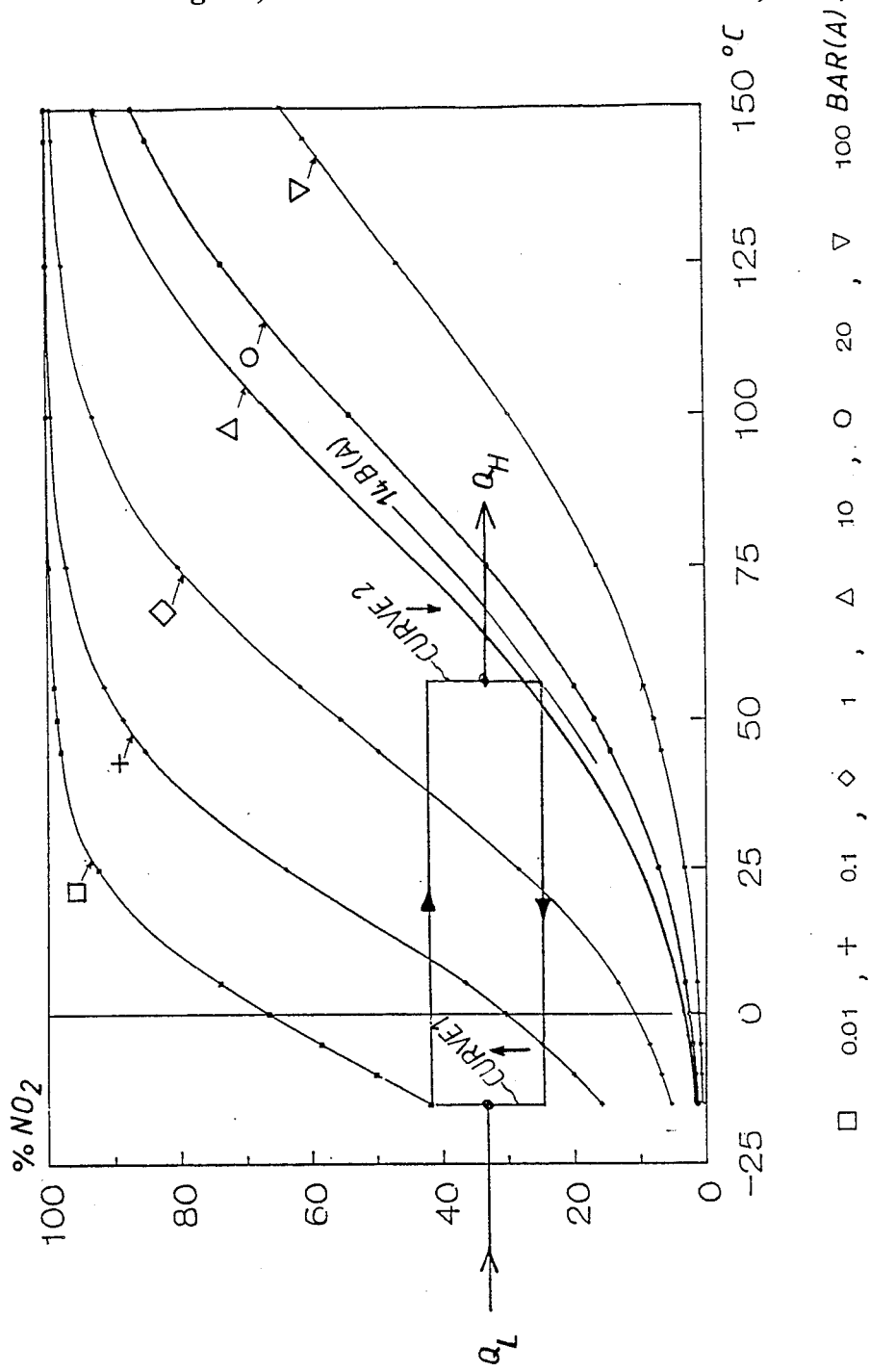
FIG. 1a is the same fundamental diagram showing a temperature difference in one step of 70 degrees C. at a 18% chemical reaction band.
Figure 2:
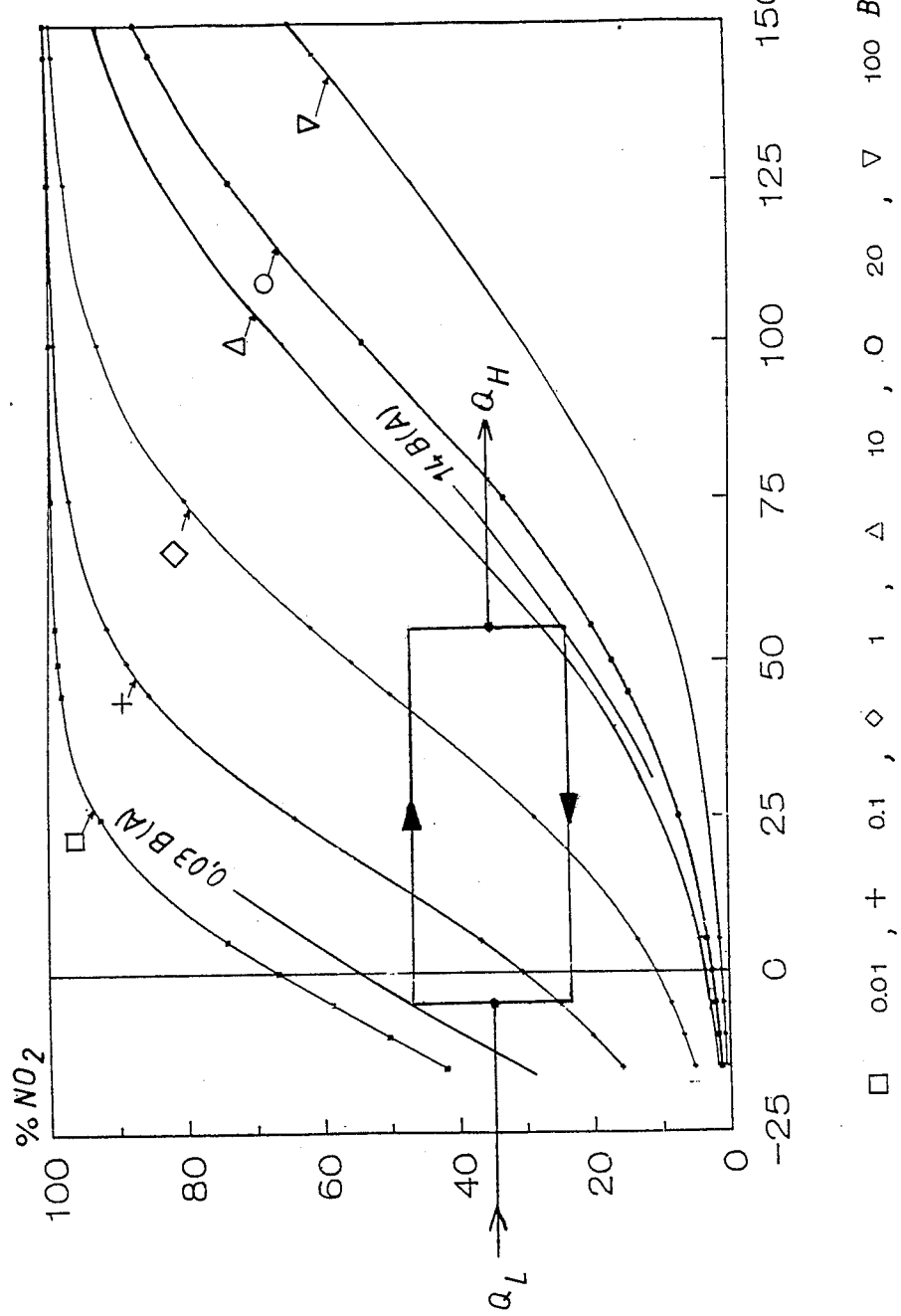
FIG. 2 shows diagram as FIG. 1 except herein is shown a temperature difference in one step of 60 degrees C., at a 23% chemical reaction band.

FIG. 1a shows the graph of the equilibrium composition of the reaction mixture, having pressure as a parameter, as a function of reaction temperature in the case of the $N_2O_4/NO_2$ system. The curve 1 in FIG. 1a shows that the endothermic reaction in the gaseous phase starts under the reduced pressure of 1kPa (0.01 bar), the composition of the reaction system being 24% $NO_2$ at $-15$ degrees C. The endothermic dissociation reaction of the dinitrogen tetroxide takes place and the composition of the gaseous reaction mixture becomes 42% $NO_2$. Curve 2 shows that when carrying out the gaseous phase reaction under a pressure of 1.4 MPa (14 bar), wherein said composition of the reaction system is 42% $NO_2$, the exothermic reaction of the dimerization of nitrogen dioxide proceeds and the composition becomes 24% of $NO_2$.

Repeating the cycles of the processes of curve 1 and curve 2 alternately, it is possible to raise the temperature from $-15$ degrees C. to $+56$ degrees C. and recover this energy, but mechanical work in which the pressure increases from 1.0 kPa to 1.4 MPa is necessary to realize the above mentioned cycle; due to the heat loss of the compressor (at compressor efficiency of 80%), the end temperature of the said reaction increases with approx. 15 degrees C. to 71 degrees C. It can be seen in FIG. 1 that by said repeating of cycles, a temperature of 75 degrees C. is attainable, meaning that the end temperature increases up to 90 degrees C. (due to the heat loss of the compressor) In general it can be said that the maximum temperature raised in one step at a maximum temperature of 55 degrees C. (+15 degrees C. increase due to compressor heat), being 70 degrees C. can be achieved, showing a C.O.P. of 2.9 (see FIG. 5, at 55 degrees C.).

According to the drawings, the detail of the present invention will be described below, using the $N_2O_4/NO_2$ system as an example.

Figure 6:
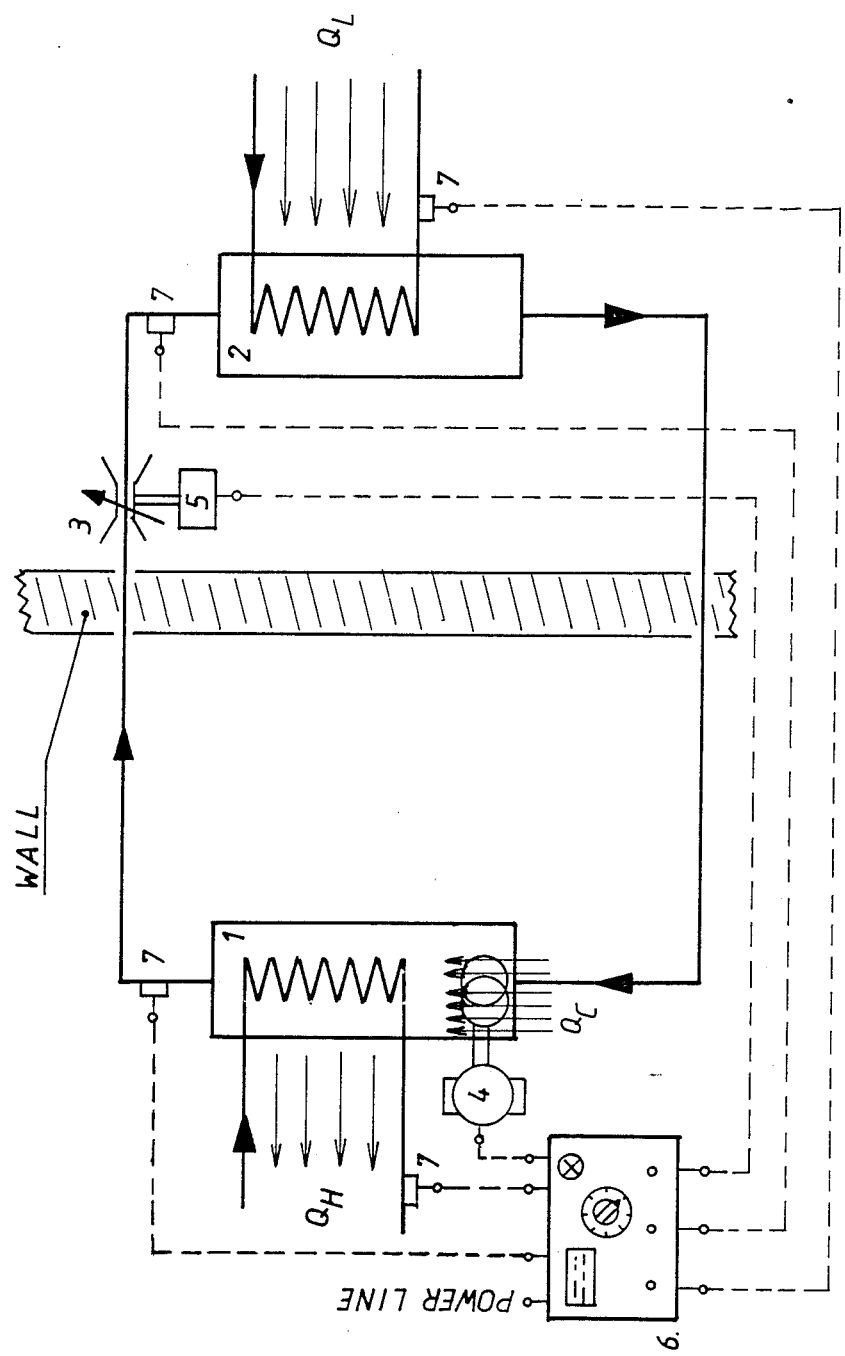
FIG. 6 is a schematic drawing of the chemical heat pump system of the present invention.

FIG. 6 is a schematic drawing of the chemical heat pump system of the present invention. In the drawing, symbol 2 is an endothermic reactor/heat exchanger, (1) is an exothermic reactor/heat exchanger, (3) is an expansion valve, (4) is a compressor, (5) is the control unit for adjusting the restriction rate of the expansion valve, (6) is the computer controlled regulating device and (7) are the temperature sensors. In FIG. 6 symbol (2) means the endothermic reactor tank (at the same time heat exchanger) which absorbs heat Q low from outside of the system as the next dissociation reaction proceeds:

$$N_2O_4 \text{ (g)} \rightarrow 2 NO_2 \text{ (g)}$$

On the other hand, symbol (1) represents the exothermic reactor tank (at the same time heat exchanger) in which the following dimerization reaction takes place. The heat $Q$ high generated in the exothermic dimerization reaction is here taken out of the system:

$$2 NO_2 \text{ (g)} \rightarrow N_2O_4 \text{ (g)}$$

Figure 4:
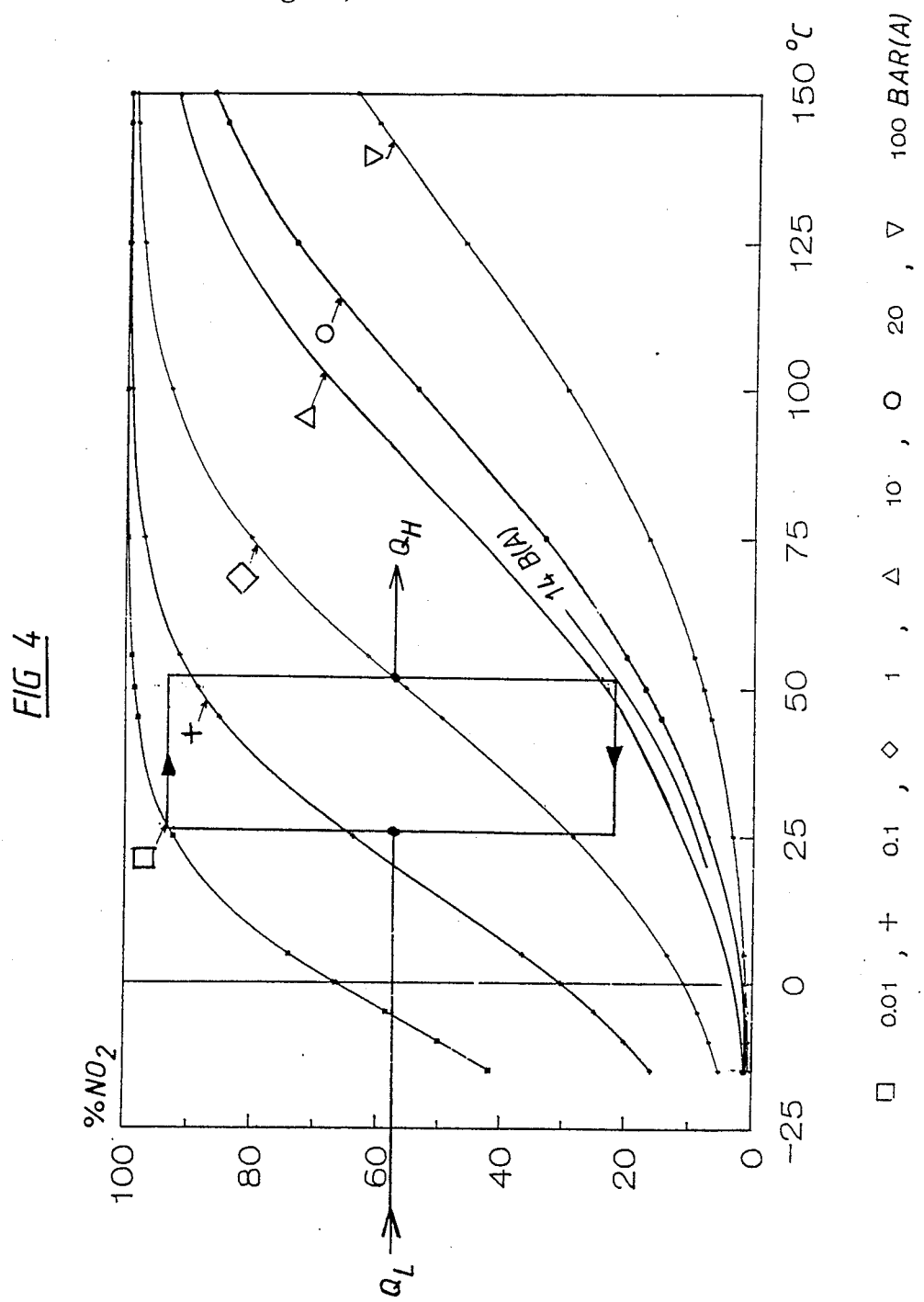
FIG. 4 shows diagram as FIG. 1, now having a temperature difference in one step of 25 degrees C. at a 70% chemical reaction band.
Figure 6A:
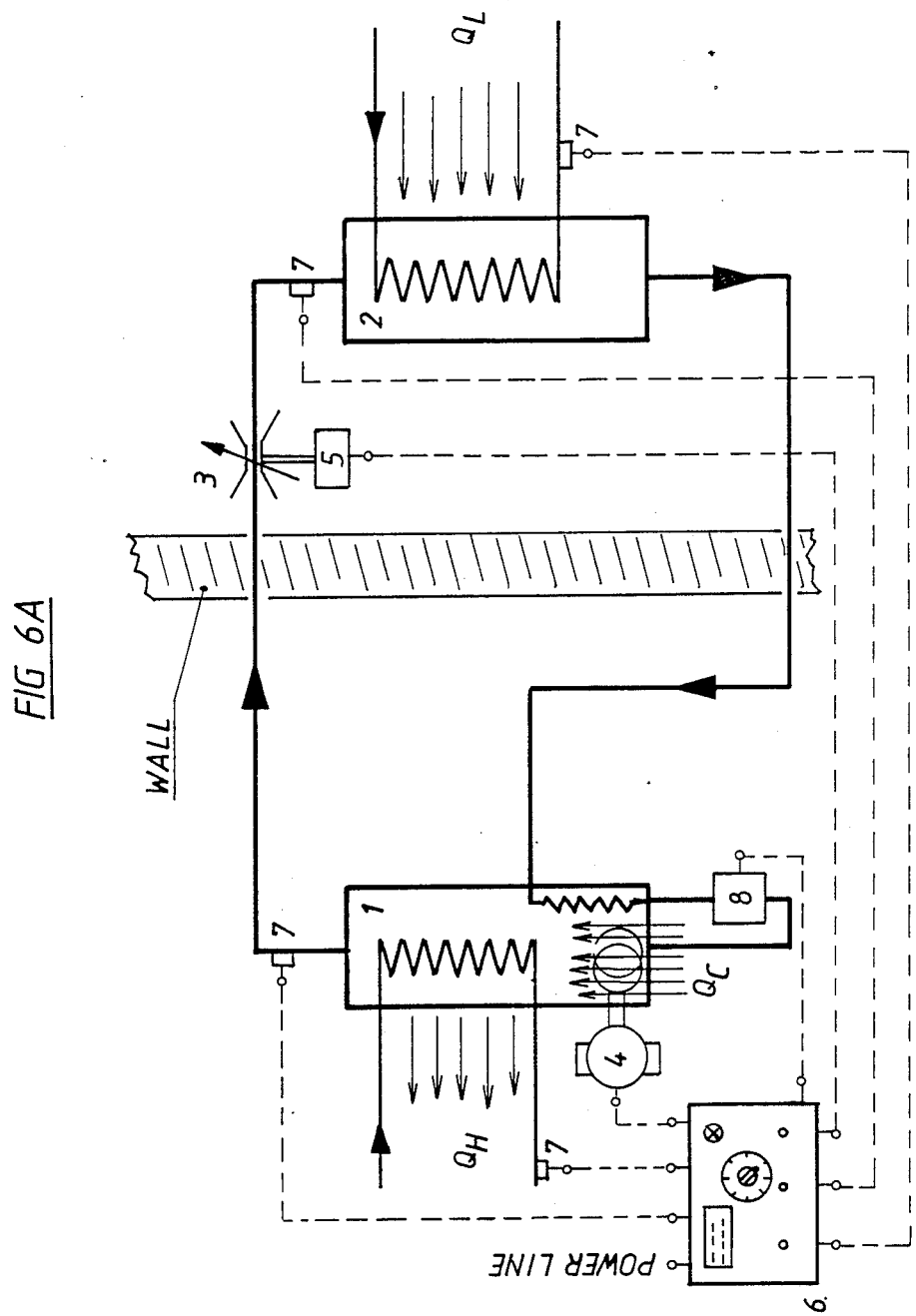
FIG. 6a is the same schematic drawing of the chemical heat pump system of FIG. 6 with an extra preheating coil and electrical heater.

Namely, as is known, at the above mentioned reaction conditions of temperature and reduced pressure the dissociation reaction of dinitrogen tetroxide proceeds and nitrogen dioxide is produced. In this endothermic reaction, the reaction system absorbs heat $Q_{low}$ from the outside lower grade heat source. It is possible to obtain 94% $NO_2$ with this system (see FIG. 4). A mixture of $NO_2$ and $N_2O_4$ formed by the dissociation reaction, passes through a heat exchanger (2) [endothermic reactor tank] and is compressed by the compressor (4), then introduced into the exothermic reactor tank (1). The high pressure gas fed into the exothermic reactor tank causes the exothermic reaction, namely the dimerization of nitrogen dioxide, then gives off heat energy $Q_{high}$. This reaction for example reaches to 70% of completion, with respect to $NO_2$ when the reaction temperature is 72 degrees C. at a pressure of 2 MPa (20 bar). After the exothermic reaction the gas mixture is fed back into the endothermic reactor tank (2) via the expansion valve (3), reducing the pressure considerably [pressure drop can be controlled by unit (5) as to regulate the desired temperature or heating/refrigerating capacity]. Numeral (7) indicates temperature measuring devices for use in controlling the system. In this cycle the system not only absorbs heat value $Q_{low}$ from the lower grade heat source existing outside the system, but also gets the heat value $Q_c$ of the compressor, then giving off the heat value $Q_{high}$ to the outside of the system. If the chemical heat pump system has to cover desired final temperatures exceeding 72 degrees C. (and/or a pressure higher than 6 bar), a preheating system is needed (see, FIG. 6A) for the gas entering the compressor (4) to avoid liquifying of the gas during compression cycle.

Therefore the gaseous reactant will be preheated by use of an extra heat exchanger located (also) in the exothermic reactor tank and further heated up to the desired overtemperature by means of the electrical/thermal heater (8). It is well known that you can regain the energy, lost by expansion; for instance by using an expansion turbine. But for reason of simplicity and the fact that the purchase price of a heat pump system should be earned back in a short time, rather than having a slightly higher C.O.P, having an expensive system which is economical not interesting. Generally the C.O.P. of a chemical heat pump system is expressed as:

$$C.O.P. = \frac{\text{heat power}}{\text{input workload}} = \frac{Q \text{ high}}{Wc}$$

Figure 5:
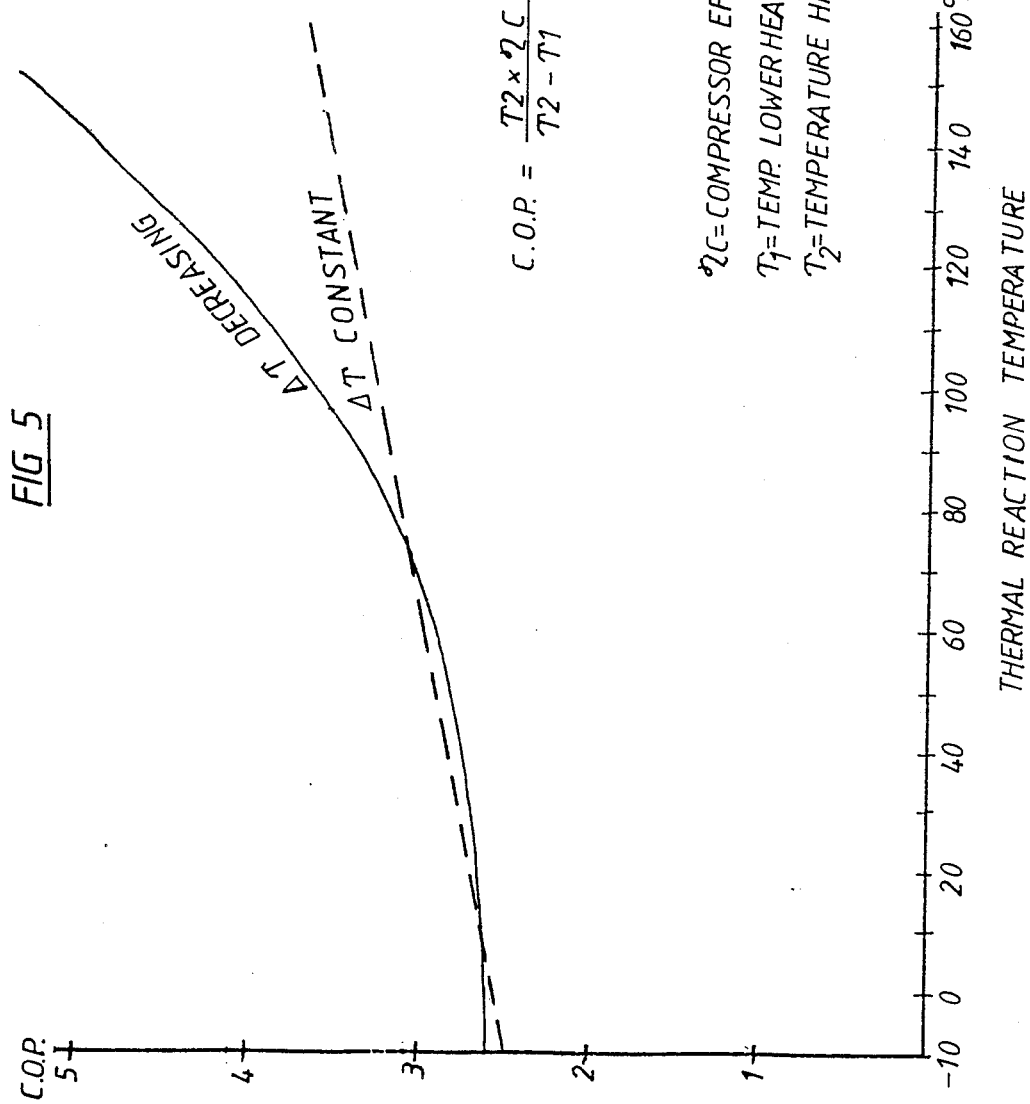
FIG. 5 is a plot showing the relation between temperature caused by an exothermic reaction and the coefficient of performance (C.O.P.)

Therefore, the efficiency of the heat pump system becomes larger when the input workload becomes smaller. It is easy to understand that the system of the present invention cannot only utilize the reversible reaction system of $N_2O_4/NO_2$ and $NO_2/NO+O_2$, but it can also utilize other reversible dissociation/association reactions. The C.O.P. can be also calculated as follows:

$$C.O.P. = \frac{T_2 \times Ec}{T_2 - T_1}$$

where Ec represents efficiency (see for further information FIG. 5)

The best compression ratio should be selected in the present invention so that the C.O.P. should not be lowered, considering the conversion in the exothermic reaction, since the power to operate the compressor increases when the pressure in the exothermic reaction tank increases.

Figure 3:
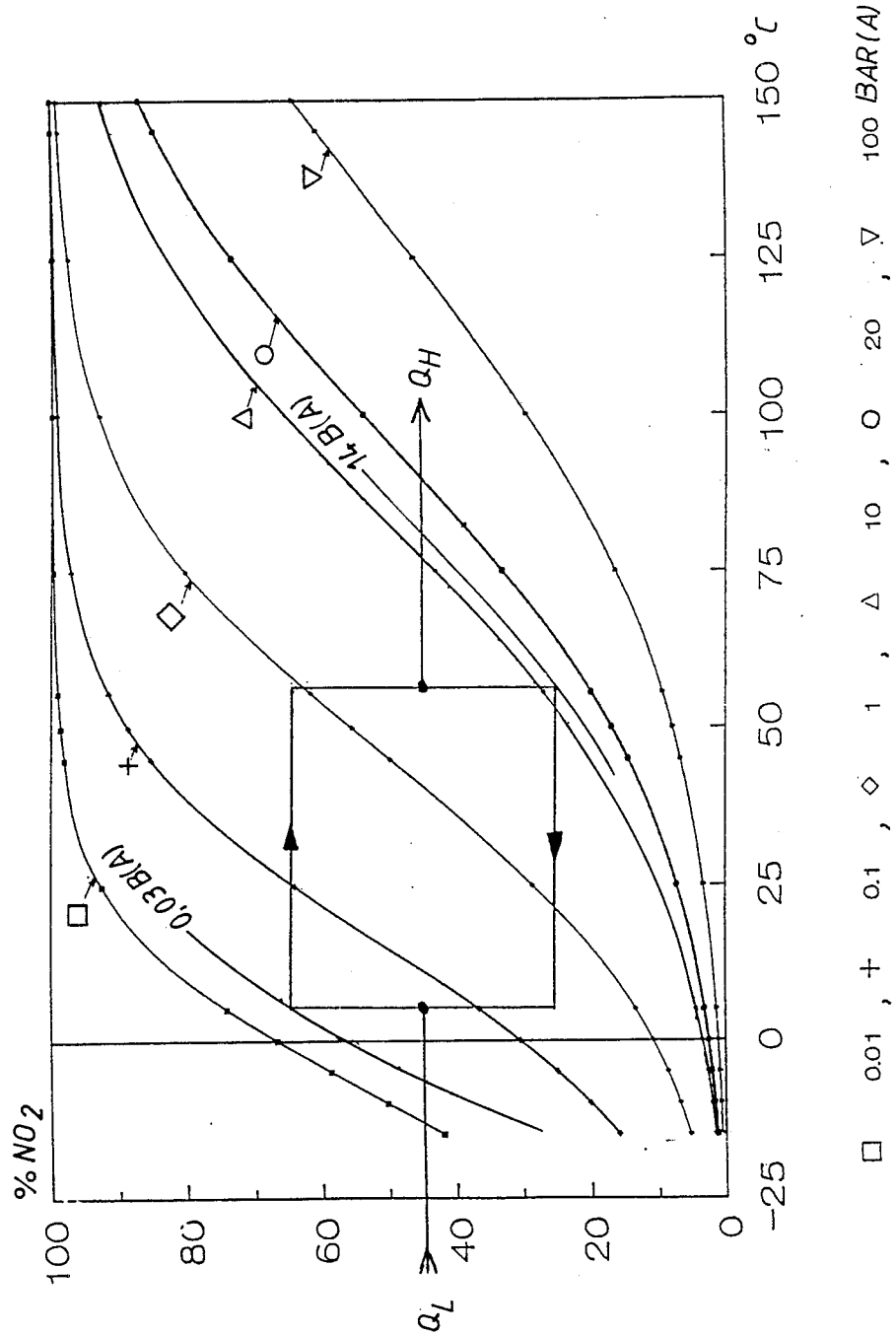
FIG. 3 shows diagram as FIG. 1, but now with a temperature difference in one step of 50 degrees C. at a 40% chemical reaction band.

In the present invention the said chemical reactant is very attractive from a view point of economical costs. For example, in an experimental set-up of the present invention shown in FIG. 6 utilizing $N_2O_4$ as the gas to be dissociated the compressor(s) were running with a load of in total 3,9 kW, achieving a pressure of 13 bar and a vacuum of 0.03 bar. The electrical heater (8) had a power consumption of 0.6 kW. The heat value of $Q_{high}$ was 12.8 kW and Q low was 8.3 kW at 5 degrees C. We did realize a raise of temperature in one step of 50 degrees C. and a C.O.P. of 2.8 (see FIG. 3 and FIG. 5). Caused by the mechanical heat given off by the compressor (and the electrical preheater), the final temperature rose to 67 degrees C. So the C.O.P. number in the practice was nearly 3.

What is claimed is:

1. A chemical heat pump system comprising a compressor and an exothermic reactor tank/heat exchanger utilizing the chemical reaction heat of a perfectly reversible chemical dimerization reaction system having only one (gaseous) compound characterized by a controlled variable expansion valve and means for controlling the expansion of said valve as a function of the desired end temperatures of the system.

2. The chemical heat pump system as claimed in claim 1, in which said gaseous compound is $N_2O_4$ and the perfectly reversible chemical dissociation reaction is:

$$2NO_2 \text{ (g)} \rightleftharpoons 2NO \text{ (g)} + O_2 \text{ (g)}$$

3. The chemical heat pump system as claimed in claim 1, having a compound with perfectly reversible chemical dissociation reaction:

$$H_2S \text{ (g)} \rightleftharpoons H_2\text{(g)} + S \text{ (g)}$$

4. The chemical heat pump as claimed in claim 1, having a compound with perfectly reversible chemical dissociation reaction:

$$2 HI \text{ (g)} \rightleftharpoons H_2 \text{ (g)} + I_2 \text{ (g)}$$

5. The chemical heat pump system as claimed in claim 1, wherein the expansion valve is controlled by a computer processing unit 6. The chemical heat pump system as claimed in claim 1, wherein the parameters for controlling—and safety circuits may be cheap and "easy-clamp-on" temperature pickups.

7. The chemical heat pump system as claimed in claim 1 wherein the compressor is immersed in the exothermic reactor tank/heat exchanger.

8. The chemical heat pump system as claimed in claim 1 wherein the compound is preheated before entering the compressor, by means of a heat exchanger in the exothermic reactor tank.

9. The chemical heat pump system as claimed in claim 8, wherein the compound, after leaving the heat exchanger, will be further heated-up by means of a heater, before entering the compressor.

10. The chemical heat pump system as claimed in claim 9, wherein the amount of energy needed to achieve the desired temperature of the compound, will be controlled in proportion to the variation of the electrical current of the compressor during operation.

11. A heat pump system comprising:
  a. first heat exchanger means to supply heat from an outside heat source for causing the dissociation within said first heat exchanger means of a gas capable of reversible dissociation without any phase transition;
  b. means separated from said first heat exchanger means for compressing the dissociation products of said first heat exchanger means without a phase transition and injecting under pressure the products into a second heat exchanger, the compression of said products within said second heat exchanger means causing the dissociation products to recombine and remain as a gas in an exothermic reaction giving off heat at a temperature which is higher than said heat source;
  c. expansion valve means for expanding to a lower temperature and pressure without a phase transition of the recombined gas leaving said second heat exchanger means;
  d. means for delivering the expanded gas to said first heat exchanger means for repeating the cycle; and
  e. means for controlling the expansion of said expansion valve means in accordance with desired temperatures.

12. The system of claim 11 where said gas being dissociated is $N_2O_4$.

13. The system of claim 11 where said gas is $H_2S$.

14. The system of claim 11 where said gas is HI.

15. The chemical heat pump system of claim 11 utilizing the chemical reaction heats of a series of perfectly reversible chemical reactions of essentially one gaseous compound dinitrogen tetroxide, and dissociating into nitrogen dioxide and on his turn nitrogen dioxide dissociating into nitrogen monoxide and oxygen respectively as indicated below:

$$N_2O_4 (g) \rightleftharpoons 2NO_2 (g) \rightleftharpoons 2NO (g) + O_2 (g)$$

covering temperature ranges of $-25$ degrees C. up to $+150$ degrees C. and 150 degrees C. to 600 degrees C. respectively.

* * * * *